United States Patent [19]

Stewart

[11] Patent Number: 4,662,465
[45] Date of Patent: May 5, 1987

[54] WALKING VEHICLE

[76] Inventor: David E. S. Stewart, 20 Albany Gardens East, Clacton-on-Sea, Essex CO15 6HP, England

[21] Appl. No.: 718,990

[22] Filed: Apr. 2, 1985

[30] Foreign Application Priority Data

Apr. 2, 1984 [GB] United Kingdom ............... 8408458

[51] Int. Cl.$^4$ ........................................... B62D 57/02
[52] U.S. Cl. .................................................. 180/8.1
[58] Field of Search .................. 180/8.1, 8.2, 8.3, 8.4, 180/8.5, 8.6, 8.7; 305/3, 4

[56] References Cited

U.S. PATENT DOCUMENTS

| 3,002,578 | 10/1961 | Kraus ................................. 180/8.1 |
| 3,331,463 | 7/1967 | Kramer . |
| 3,734,220 | 5/1973 | Smith . |
| 4,202,423 | 5/1980 | Soto . |
| 4,502,556 | 3/1985 | Bartholet ............................ 180/8.6 |
| 4,527,650 | 7/1985 | Bartholet ............................ 180/8.6 |
| 4,558,758 | 12/1985 | Littman et al. ..................... 180/8.1 |

FOREIGN PATENT DOCUMENTS

| 0010034 | 4/1980 | European Pat. Off. . |
| 1013227 | 8/1957 | Fed. Rep. of Germany . |
| 0084012 | 7/1983 | France . |
| 2553368 | 4/1985 | France . |
| 31879 | 3/1981 | Japan .................................. 180/8.2 |
| 881911 | 11/1961 | United Kingdom . |
| 952584 | 3/1964 | United Kingdom . |
| 1466821 | 3/1977 | United Kingdom . |
| 692948 | 10/1979 | U.S.S.R. ............................. 180/8.5 |
| 823212 | 4/1981 | U.S.S.R. ............................. 180/8.7 |

Primary Examiner—John J. Love
Assistant Examiner—Charles R. Watts
Attorney, Agent, or Firm—Millen & White

[57] ABSTRACT

A vehicle (1) comprises first and second bodies (2,3) connected together, each body having three legs (5,5') and the bodies are movable separately. There is a third body (4) connected to the first body (2) on a spindle 10 for relative pivotal movement and connected to the second body (3) for sliding movement. The legs are articulated at joints 7 and 8 and are adjustable in length. Each leg has a foot 9 which is replaceable. The vehicle undergoes movement or walking and the combination of sliding and pivoting allows changes in direction to be quickly and easily accomplished.

26 Claims, 11 Drawing Figures

WALKING VEHICLE

BACKGROUND OF THE INVENTION

1. Field of the Invention

This invention relates to vehicles, more particularly to vehicles having a plurality of legs.

2. Prior Art

Historically most vehicles have had wheels. More recent developments have been with track laying vehicles and combinations of these with wheels. Hovercraft can also be said to be vehicle.

All the above are limited by the type of terrain that they can negotiate. In certain conditions, a vehicle with a plurality of legs or legged vehicle that can "walk" has considerable advantages.

Some, although not all, robots are vehicles. However, a two legged robot has to have dynamic balancing in order for it to walk and for it to have long enough legs to climb over obstacles would require a complicated system. Various multi-legged vehicles are possible, including multi-legged robots. Anything that has less than six legs is likely to require some degree of balance during moving, or "walking". A six legged vehicle is known that can move a pair of legs at a time and still be in a stable condition on the other four. Each leg can move forwards and backwards as well as having knee and hip pivot joints. Forward motion is achieved by moving the body forward with the legs swivelling backwards, then lifting successive legs and moving them forwards and placing them on the ground before doing the next body move. Changing direction is achieved by moving the legs on one side further than on the other side.

Some sideways movements could be done by combined hip and knee joint moves with the legs on the ground and bringing them to suitable positions for the next move.

All these movements are complicated and would require computer control in order to coordinate them with any speed and turning through 90 degrees would require a number of moves. To overcome the limitations of these conventional leg configurations and moves, the vehicle in accordance with the present invention is constructed in a different way.

SUMMARY OF THE INVENTION

According to a first aspect of the present invention a vehicle comprises two bodies connected together, each body having three legs and the bodies being separately movable, the interconnection of the bodies providing relative rotational movement. The term vehicle as used throughout the specification and claims is to be construed broadly and includes any means of transportation, whether merely of itself or of objects other than itself. The term vehicle as used herein also includes models and toys. Movement may be self powered or controlled from outside, for example radio controlled. The rotational movement is preferably through at least 90 degrees and may be via a rotating member or shaft.

The vehicle may have more than two bodies and at least two bodies have at least three legs each. The bodies are moved separately so that at any time the legs of at least one body are in contact with the ground maintaining stability. This allows the other body to be moved either laterally, vertically or in rotation with its legs temporarily not in contact with the ground. The bodies are preferably in different planes.

Further at least one of the bodies can preferably undergo lateral movement, which movement may suitably be a sliding movement.

In one embodiment the bodies can undergo relative movement in a vertical plane. A further body may be provided connected to each of the other bodies.

According to a second aspect of the present invention a vehicle comprises three bodies, the first and second bodies being interconnected to rotate relative to the third body and the second and third bodies being interconnected to move laterally with respect to the first body. Preferably all three bodies lie in different horizontal planes, the first body being the uppermost and the third body being lowermost.

A vehicle in accordance with either aspect of the present invention preferably has at least one of the legs adjustable in length, more preferably all the legs attched to one body are adjustable in length. Thus one or both sets of legs may be adjustable in length. Such adjustment may be telescopic or by means of one or more joints.

A working implement such as a crane, jig or digging implement maybe attached to a vehicle in accordance with the present invention.

The invention may be put into practice in various ways but one vehicle and one modification in accordance with the present invention will now be described by way of example with reference to the accompanying drawings, in which:

DESCRIPTION OF THE PREFERRED EMBODIMENT

Figure 1:
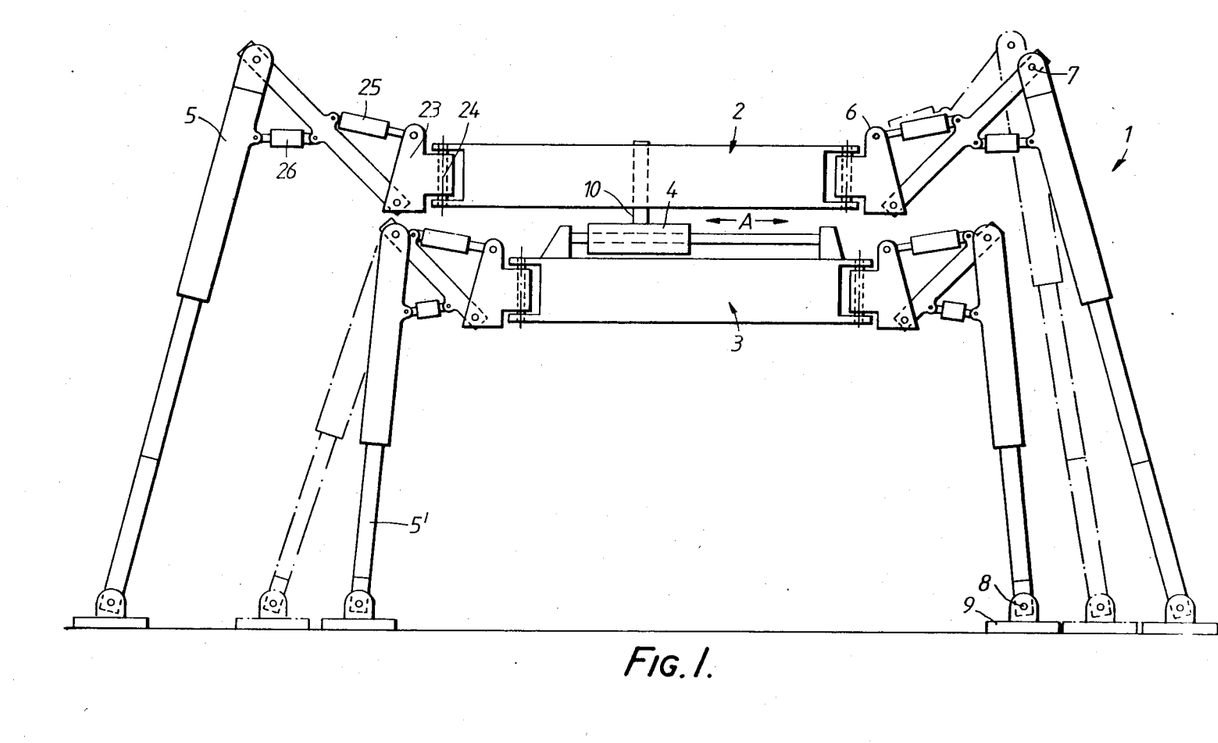
FIG. 1 is a side view of a vehicle.

FIG. 1 shows a vehicle 1 having an upper body 2, a lower body 3 and a central body 4. Each of the bodies 2 and 3 has three spaced legs 5,5'. Each leg on a respective body is spaced approximately 120° apart. The body 2 is above the body 3 and the legs are positioned so that each of the legs of the lower body 5' lies between the legs of the upper body 5, when viewed in plan. Each leg has an upper "hip" joint 6 with two degrees of rotational freedom, a "knee" joint 7 with one degree of rotational freedom and an articulated "foot" joint 8 to which a foot 9 is attached.

The legs can be made of many configurations with one or more joints and ability to pivot in any direction. The legs could also be telescopic in any or all their elements.

The upper body 2 pivots on a vertical spindle 10 relative to the center body 4, around a pivot point 11 so that when the vehicle is being supported on the lower body legs 5' the upper body legs 5 can be lifted off the ground and the upper body can then rotate in either direction of the spindle.

The lower body 3 can slide as shown by double headed arrow A relative to the center body. With the weight of the vehicle being taken on the upper body legs 5 the lower body 3 can move horizontally relative to the center body. Also the center and lower body can rotate relative to the upper body underneath the upper body. Alternatively the sliding motion could be between the upper and center bodies with the rotation being between the center and lower bodies. The legs may be connected to the bodies in a number of ways and a particular form of linkage is shown in FIG. 1 using a bracket 23 connected to the body by a spindle 24 and to the upper part of the leg 5 by a piston joint 25. A further piston joint 26 may be present between the upper and intermediate parts of the leg 5.

To achieve "walking" in any direction, there needs to be some relative vertical motion to allow the legs on the upper body to take the weight and then have the legs on the lower body to take the weight. This can be done in a number of ways. Three possible ways are:

1. Vertical motions of the legs using joints, for example "knee" joints or equivalents.
2. Telescopic motions for one or both sets of legs.
3. Vertical slide motion built into the rotation between the upper and center bodies.

Any combination of these could also be used.

Movement of the vehicle will now be described with reference to FIGS. 2 to 6. The terms upper, lower, right, left, horizontal, vertical and the like as used throughout the specification including the claims are relative terms and not to be construed as in any way limiting. In the embodiment shown in FIGS. 2 to 6 there are three fixed legs 5' on the lower body 3 and three extendable legs 5 on the upper body 2. Movement or "walking" in a straight line from left to right will now be described.

Figure 2:
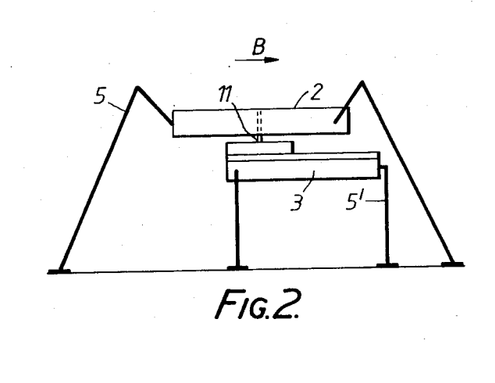
FIGS. 2 to 6 show schematic side views similar to FIG. 1 in which the vehicle is shown in a sequence of positions showing movement of the vehicle.
Figure 3:
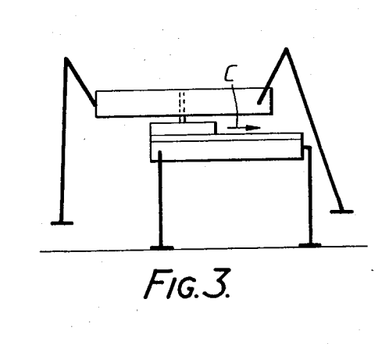
Figure 4:
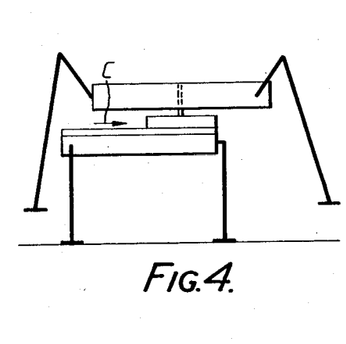

FIG. 2 shows the vehicle with all six legs on the ground with the lower body moved to the right relative to the centre body, as shown by the arrow B. The legs are then retracted on the upper body as shown in FIG. 3 and the weight is taken on the lower legs. The upper and center bodies then slide to the right on the lower body, as indicated by arrow C in FIGS. 3 and 4 to the position shown in FIG. 4. The upper legs are then extended as indicated by arrow D to take the weight off the ground as shown in FIG. 5.

Figure 5:
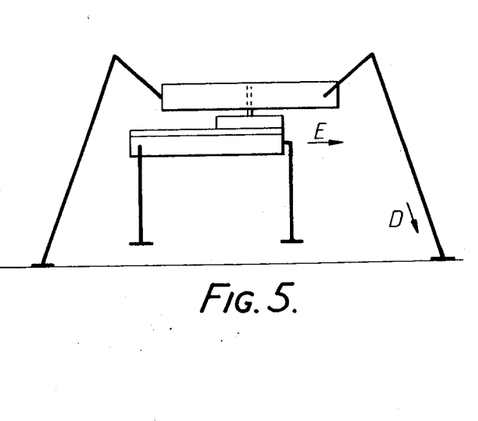
Figure 6:
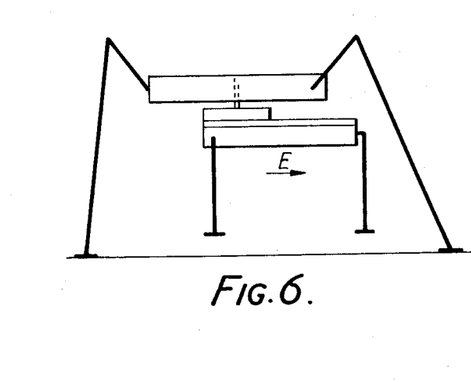

The lower body then slides to the right in the direction of arrow E in FIGS. 5 and 6 to the position shown in FIG. 6. The upper legs are then retracted so that the lower legs again contact the ground. The vehicle is then once again in the position shown in FIG. 2 with both sets of legs on the ground but having moved in a straight line as shown by sideways movement to the right as shown in FIGS. 2 to 6.

Both sets of legs may be adjustable in length. In this case when transferring the weight from one set of legs to the other set of legs there can be an indefinite period when both sets of legs are in contact with the ground.

When either or both sets of legs are adjustable in length there may also or instead be relative vertical movement of the bodies with respect to each other.

Movement giving a change of direction will now be described starting from the position shown in FIG. 3.

The weight is taken on the lower legs while the upper body is free to rotate, under control, in any direction. It could therefore for example turn 90 degrees. In the position shown in FIG. 5 with the weight on the upper body legs, the lower and center bodies can then turn in the same direction as the upper body. This brings the bodies back in line but having turned 90 degrees in a simple move.

In practice the rotation could be limited to just over 180 degrees in either direction to simplify the connection between the bodies such as handling of cables and wires between the bodies.

The lower body could of course be rotated first from a position as shown in FIG. 5 followed by rotation of the upper body when a position as shown in FIG. 3 is reached. In the embodiment described moving is carried out by relative sliding motion between the bodies. The movement in one direction is intermittent. Change in direction is achieved by rotating one body relative to the other when the weight is taken on the set of legs not connected to the body being rotated. Rotation of the other body when it is not bearing the weight of the vehicle can bring the two bodies into alignment or be used to further alter or correct the change in direction.

There are numerous applications for such a vehicle including: lifting, digging, dredging, transport of personnel and objects such as over difficult terrain, whether self propelled or controlled remotely, and recreation, such as obstacle racing.

Figure 7:
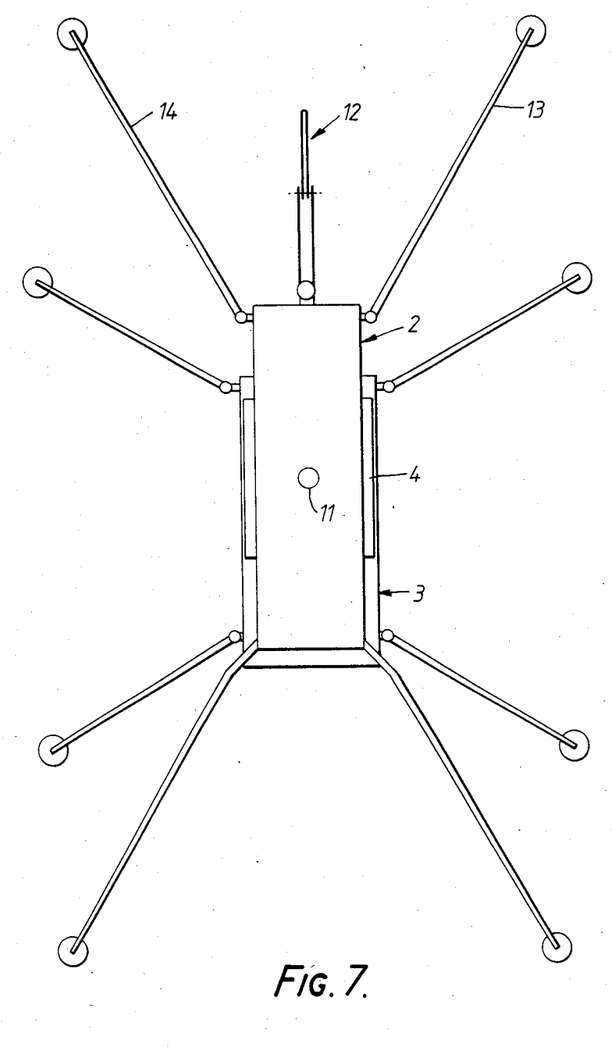
FIG. 7 shows a modified vehicle similar to that shown in FIGS. 1 to 6 but in plan from above.

Most vehicles that are used for lifting such as mobile cranes, or for digging, such as tractors, rely on substantial counterbalancing weight to offset the load on the crane or shovel. This is not the case with a vehicle according to the present invention. FIG. 7 shows an eight legged vehicle with a crane jib 12. By having at least two of the legs 13,14 in line with or forward of the jib 12 all the weight of the lift will be taken by the legs without the need of heavy counterbalance. The structure of the vehicle can therefore be lightweight. With extended legs the vehicle would be able to stand in a reasonable depth of water and so be able to carry out dredging operations.

Further, two of the major advantages of such a vehicle is its ability to walk over obstacles such as walls, fences, ditches and the like and its ability to be made lightweight enabling it to be airlifted for example by helicopter. This allows it to be put close to the site of operation quickly and easily from whence it can operate. In the case of operation in difficult terrain it can thus be airlifted as close as possible before the terrain becomes unnavigatable by other means of transporation.

As with most vehicles it would be possible to use a vehicle according to the present invention in competetive sport, such as over obstacle course trials or racing. The vehicle of the present invention is capable of adaption in a variety of ways for a variety of specialist usages. It may be made in many sizes and with a variety of configurations and features. A particularly lightweight vehicle may be produced using for example reinforced plastics with carbon fibre, kevlar, etc. This would give high specific strength and also good corrosion resistance.

The vehicle may carry a set of leg extenders that could be easily attached when required. As each leg can be raised off the ground, and with lightweight construction, it would be easy to fit the extensions for operation such as in water or in water logged ground. A selection of removable feet could be fitted to suit the application and environment. As with the legs, it could carry a selection of feet to do different jobs. The feet can be of rubber covered for non-slip properties and can be of large footprint for soft ground. Where digging is to be carried out forked feet may be fitted to dig into the ground to react against the forward digging forces. To make the vehicle more versatile it could be fitted with sensors that detect when each leg or foot touches the ground. This could conveniently be a load sensor and level or attitude sensors could also be provided. These sensors could be connected with a computer control that controls the various movements so that levelling can be provided and an even load distribution maintained.

Extension or retraction of one or more of the legs can be effected such as when lifting or digging, so that the center of effort of lifting, or digging, comes within the area bounded by its legs.

One form of embodiment may provide sliding motion between the center body and both the main legged bodies. The center body may be in the form of two portions which can rotate relative to one another. By providing for sliding movement with respect to both the main legged bodies so that the first portion of the center body slides with respect to the first main body and the second portion of the center body slides with respect to the second main body a longer combined stride or stroke can be accomplished for given body lengths. A further advantage of this configuration would be that with one body turned at approximately 90 degrees to the other the vehicle can move in either direction with each stride. One convenient use of such an embodiment would be to dig a trench. The support legs of the lower body can be positioned to span the trench with its centre portion or slide across the trench. The upper body can move sideways on the lower body center portion slide and in line with the trench on the upper body center portion slide.

Figure 8:
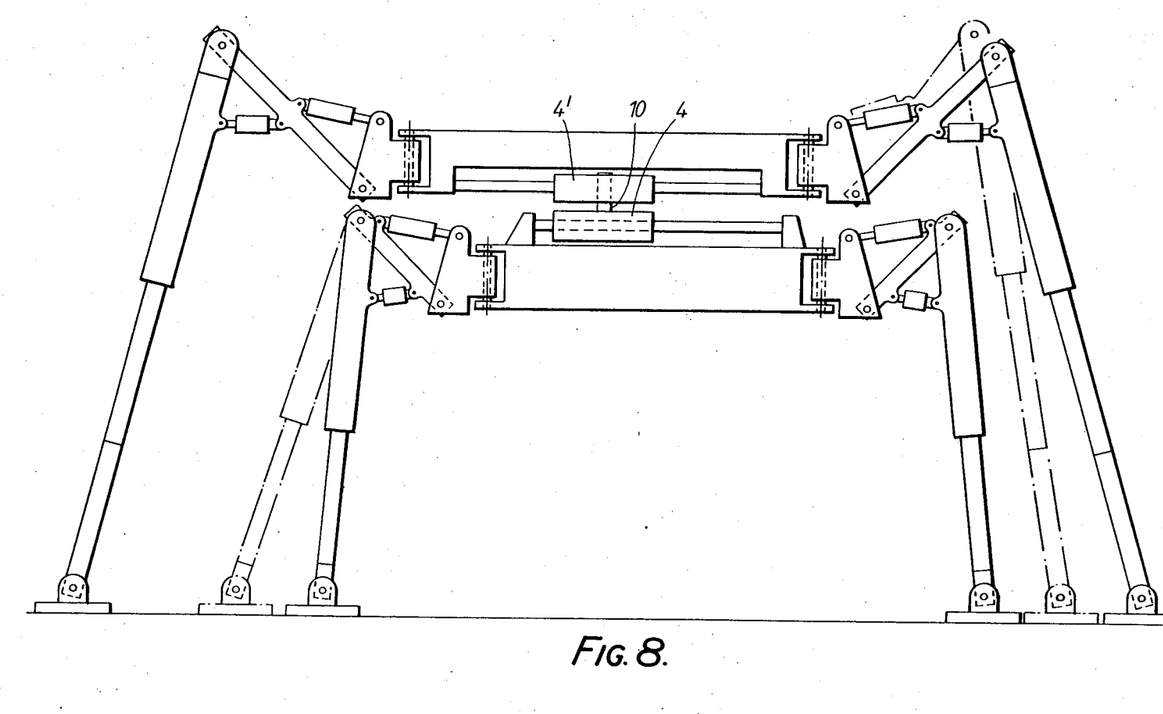
FIG. 8 is a side view similar to FIG. 1 of an alternative embodiment having four bodies.

FIG. 8 shows a side view similar to FIG. 1 of an alternative embodiment. In this case there are four bodies. Two intermediate bodies 4 and 4' are provided with an interconnecting shaft 10. The upper intermediate body 4' is connected to the upper body 2 in a similar manner to the way in which the lower intermediate body 4 is connected to the lower body 3. This allows relative sliding motion in both the upper and lower bodies.

Figure 9:
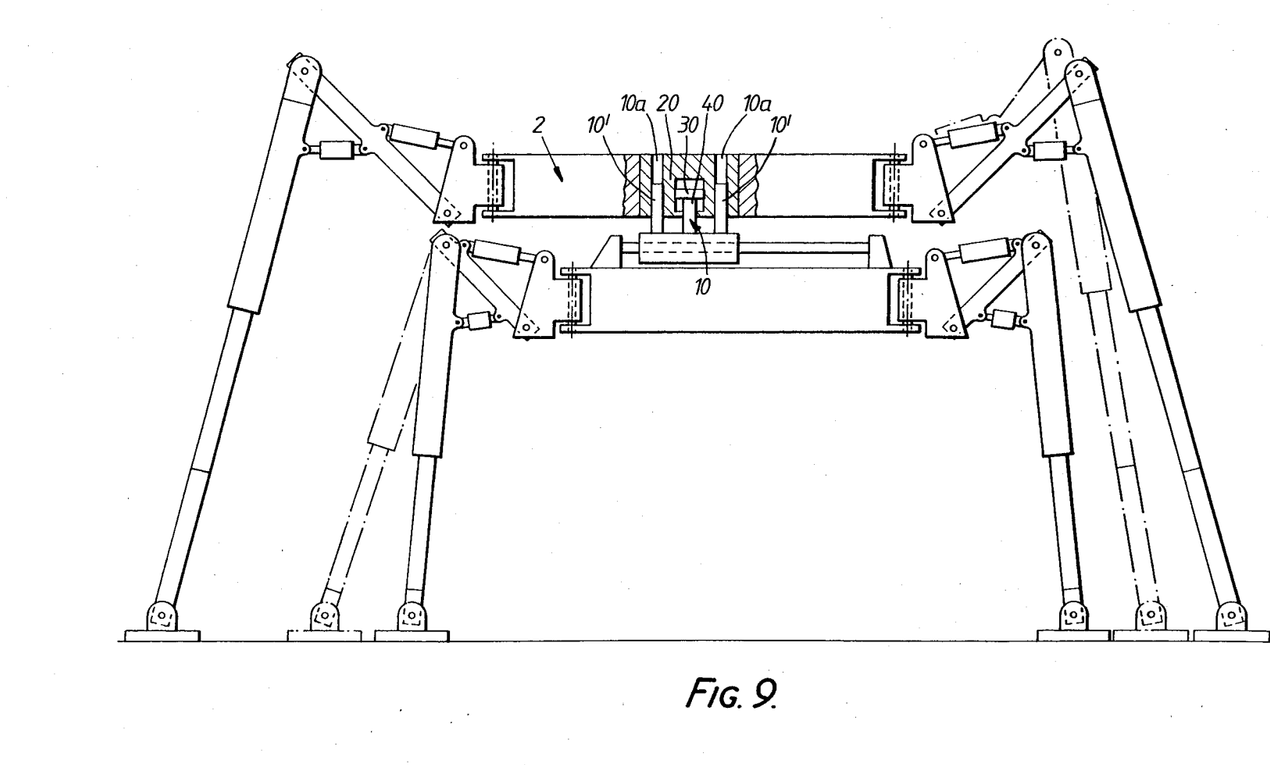
FIG. 9 is a view similar to FIG. 1 but in part section.

FIG. 9 is a view similar to FIG. 1 of a three body embodiment but with the area where the intermediate body 4 joins the upper body 2 shown in cross-section. The embodiment shown in FIG. 9 provides two further shafts or pins 10' each in its respective bore 10a allowing relative vertical motion. The main or control shaft 10 is in the form of a piston 30 and piston rod 40. The piston 10 slides in a bore in a cylinder 20 that in turn rotates within the upper body 2. The shafts or pins 10' are positioned either side of the piston rod 40 and these pins 10' slide in the bores 10a in the rotating cylinder body 20.

Figure 10A:
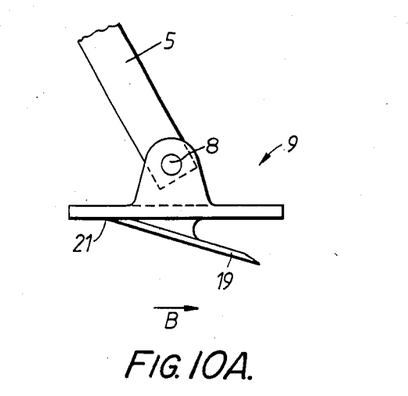
FIGS. 10a and 10b show one embodiment of a foot that may be used.
Figure 10B:
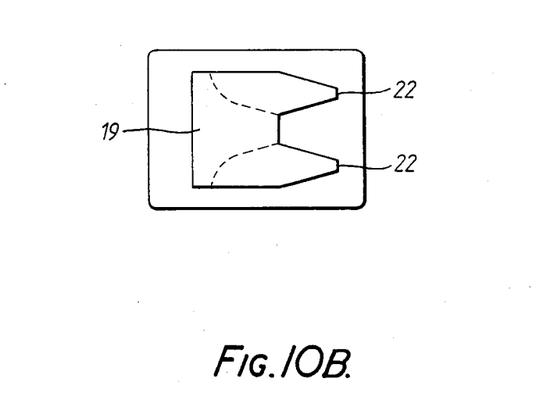

FIG. 10 shows one form of foot that may be used. Such a foot would conveniently be fitted to the front legs to react against horizontal forces exerted when digging, for example when digging a trench. The foot 9 is attached via pivot point 8 to the leg 5. The underside of the foot has a pin 19 which joins the foot at 21 towards the centre and is angled outwardly and downwardly. The pin 19 is shown having two prongs 22 in the lower plan view. In this way the foot acts as an anchor becoming more deeply entrenched and thus in deeper engagement with the ground as the leg continues to be moved in the direction of arrow B.

I claim:

1. A walking vehicle comprising first and third bodies, each having at least three articulated legs, each of the legs having a hip joint with two degrees of rotational freedom and attaching the leg directly to the body and a knee joint with one degree of rotational freedom; a second intermediate body including a rotational coupling having a generally vertical axis, at least one of the first and third bodies being mounted on the second body for sliding movement with respect thereto, and the first and third bodies being arranged for relative rotational movement about said vertical axis by means of the rotational coupling.

2. A walking vehicle according to claim 1 in which the third body substantially overlies the first body, and the second body is located vertically between the first and third bodies.

3. A walking vehicle according to claim 2 in which one of the first and third bodies is mounted for sliding movement on the second body and that the other of the first and third bodies is coupled to the second body by the rotational coupling.

4. A walking vehicle according to claim 3 in which means are provided between the first and third bodies for relative vertical movement.

5. A walking vehicle according to claim 4 having means for attaching a working implement.

6. A walking vehicle according to claim 5 wherein the working implement is a crane, a jig or a digging implement.

7. The walking vehicle according to claim 2 wherein the second body comprises a first portion and a second portion, the two portions being coupled by the rotational coupling.

8. The walking vehicle according to claim 2 wherein the first and third bodies are arranged for relative vertical movement.

9. A walking vehicle according to claim 1 in which the second body comprises a first portion and a second portion, the two portions being coupled by the rotational coupling.

10. A walking vehicle according to claim 9 in which the first body is mounted for sliding movement on the first portion and the third body is mounted for sliding movement on the second portion.

11. A walking vehicle according to claim 10 in which the first and third bodies are arranged for relative vertical movement.

12. A walking vehicle according to claim 11 having means for attaching a crane, jig, digging or other working implement.

13. A walking vehicle according to claim 1 in which the first and third bodies are arranged for relative vertical movement.

14. A walking vehicle according to claim 1 having means for attaching a working implement to the vehicle.

15. The walking vehicle according to claim 13 wherein the working implement is among a crane, a jig or a digging implement.

16. The walking vehicle according to claim 1 in which the legs have first and second portions which portions are telescoped one within the other to render the legs adjustable in length.

17. The walking vehicle according to claim 1 wherein the first and second body portions each have four legs.

18. A walking vehicle comprising first, second and third bodies, each of which lies in a different horizontal plane with the second body between the first and third bodies and with rotational coupling means for connecting the first and second bodies to the third body for relative rotation with respect thereto and sliding coupling means connecting the first and third body to the second body for lateral movement with respect to the second body, the second body having two portions with means for coupling the two portions for movement relative to one another and for movement relative to one of the first and third bodies; the first and third bodies each having at least three legs movably attached thereto.

19. A vehicle according to claim 18 in which at least one of the legs is adjustable in length.

20. A vehicle according to claim 19 in which all the legs attached to one body are adjustable in length.

21. A vehicle according to claim 20 having a working implement attached thereto.

22. A vehicle according to claim 21 in which the working implement is a crane, jig or digging implement.

23. A vehicle according to claim 18, in which at least one of the legs is adjustable in length.

24. A vehicle according to claim 23 in which all the legs attached to one body are adjustable in length.

25. A vehicle according to claim 24 having a working implement attached thereto.

26. A vehicle according to claim 25 in which the working implement is a crane, jig or digging implement.

* * * * *